Figure 3:
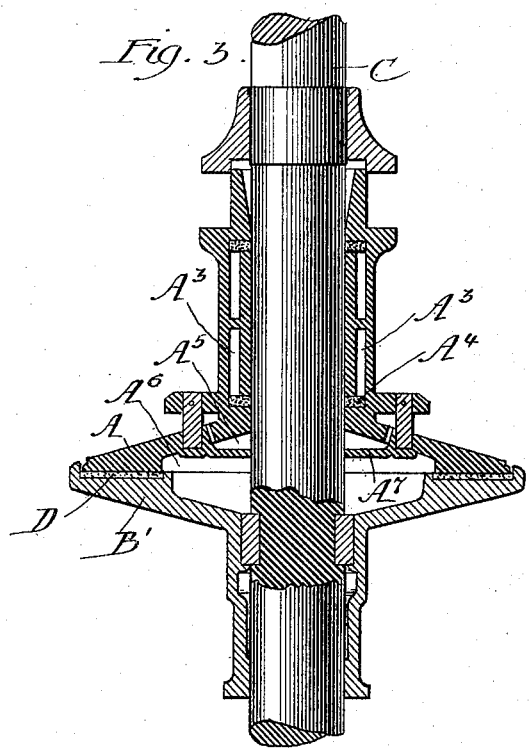

No. 625,849. Patented May 30, 1899.
W. G. PRICE.
CAR BRAKE.
(Application filed Oct. 13, 1897.)
(No Model.) 2 Sheets—Sheet 1.
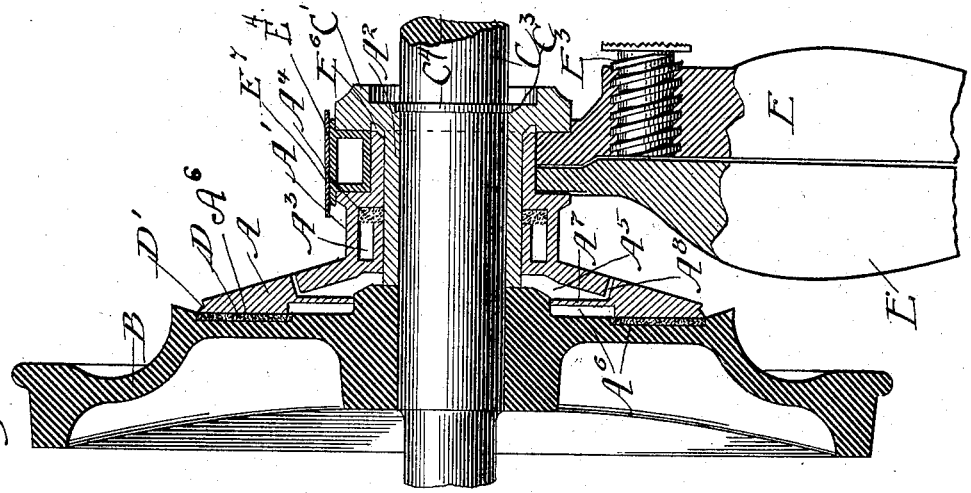
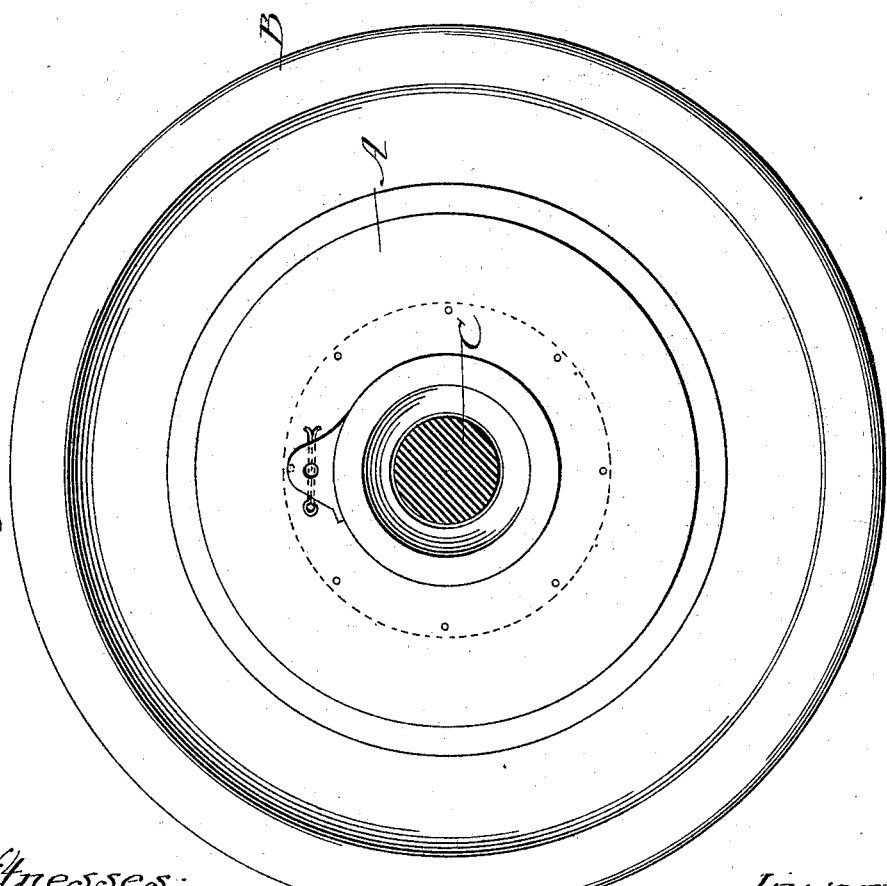
Witnesses:
Frank S. Blanchard
Donald M. Carter
Inventor:
William G. Price
By Francis W. Parker,
Attorney No. 625,849. Patented May 30, 1899.
W. G. PRICE.
CAR BRAKE.
(Application filed Oct. 13, 1897.)
(No Model.) 2 Sheets—Sheet 2.

Witnesses:
Frank S. Blanchard
Donald M. Carter

Inventor:
William G. Price
By his Attorney
Francis W. Parker

UNITED STATES PATENT OFFICE.

WILLIAM G. PRICE, OF CHICAGO, ILLINOIS, ASSIGNOR TO THE COLUMBIA BRAKE AND SUPPLY COMPANY, OF SAME PLACE.

CAR-BRAKE.

SPECIFICATION forming part of Letters Patent No. 625,849, dated May 30, 1899.

Application filed October 13, 1897. Serial No. 655,026. (No model.)

*To all whom it may concern:*

Be it known that I, WILLIAM G. PRICE, a citizen of the United States, residing at Chicago, in the county of Cook and State of Illinois, have invented certain new and useful Improvements in Car-Brakes, of which the following is a specification.

My invention relates to brakes for cars and the like, and has for its object to provide a new and improved construction for such brakes.

My invention is illustrated in the accompanying drawings, wherein—

Figure 1 is a view of a car-wheel, showing the friction-disk of the brake associated therewith. Fig. 2 is a section through the device shown in Fig. 1. Fig. 3 is a view showing the friction-disk of the brake associated with a moving part on the axle. Fig. 4 is a side view of the operating-levers of the brake, showing the oiling device in position.

Like letters refer to like parts throughout the several figures.

I have shown a brake provided with a friction-disk which bears against a moving part on the axle of the vehicle, so that when the disk is pressed against said moving part a braking effect is produced and the motion of the vehicle retarded.

As illustrated in Figs. 1 and 2, the friction-disk A of the brake is opposed to the car-wheel B on the axle C. Some suitable friction material D—such, for example, as leather—is preferably interposed between the disk A and the surface of the moving part on the axle. Some suitable means is provided for moving the disk A and the car-wheel B with relation to each other, so as to force them together, and some suitable means is also provided for oiling the bearing-surfaces.

As illustrated in Fig. 2, the friction-disk A is provided with a hub portion $A'$, which surrounds a sleeve $A^2$, fixed to the axle. The axle C and sleeve $A^2$ rotate within the hub of the disk A, and hence these bearing-surfaces must be oiled. As shown in the drawings, I provide a cavity $A^3$, which may be filled with oil and which is provided with a conducting-wick $A^4$, which conveys the oil to the bearing-surfaces. I have found that the oil from these bearing-surfaces tends to run along the disk A and get in between the disk and its opposed bearing-surface, thereby oiling the friction material D. When this occurs, the friction is so reduced as to prevent the proper action of the brake. In order to obviate this difficulty, I provide means for preventing the oil from coming in contact with the friction material D. As illustrated in the drawings, I provide a space or hollow $A^5$ in the friction-disk A, which is separated from the space $A^6$, containing the friction material, by the partition or projection $A^7$. The oil-space $A^5$ is so positioned as to receive any of the oil that comes from the bearings, and hence the oil is prevented from entering the space $A^6$, containing the friction material. A series of openings $A^8$ are placed, preferably, at the outer boundary of the space $A^5$, so that the oil may pass from such space and will then be discharged, so that it will not come in contact with the friction-space $A^6$. The friction-disk A is preferably provided with a groove at $D'$, which prevents the oil from passing around the edge of the disk and thus coming in contact with the friction material. In one form of my brake I provide two levers E E', said levers being provided with bifurcated ends $E^2$, which pass over a reduced portion of the hub $A'$. This construction is illustrated in Fig. 4, wherein I have shown a side view of the operating-levers E. (Illustrated in plan in Fig. 2.) One of these levers bears against the hub $A'$, the other bearing against the collar $C'$ on the sleeve $A^2$. This sleeve $A^2$ is forced upon the axle C and is provided with the groove $C^3$, extending therearound, in which fits the collar $C^4$, turned on the axle. In placing the sleeve $A^2$ in position it is forced on the axle by hydraulic pressure, for example, until it comes in contact with the collar $C^4$. The wheel is then forced onto the axle, the collar $C^4$ acting as a stop to limit the movement of the parts along the axle. The levers E E' are provided with means for separating their bifurcated ends, so as to force the disk A against its opposed surface. Any suitable means may be used for this purpose. As illustrated in the drawings, the ends of the levers E are pivotally connected together—as, for example, by means of the bolt I, Fig. 4—and a screw $E^3$ works in threads in one of the levers and bears against the other lever, the screw being between the ends of the levers, as shown, for example, in Fig. 4. This screw is connected by any suitable means with a handle controlled by the operator on the car. It will thus be seen that when this screw is moved in one direction it bears against one of the levers E and separates the ends of the levers which are associated with the friction-disk. As one lever bears against the collar C' and the other against the hub A' of the friction-disk, the separation of these ends moves the friction-disk toward its opposed surface. This construction is similar to that set out in my prior patent, No. 572,823, dated December 8, 1896.

An oil-cup $E^4$ of any suitable description may be placed between the bifurcated ends of the levers, the oil-cup being provided with a suitable opening, which admits oil to the bearing-surfaces of the parts. This oil passes down through the space $E^6$ (see Fig. 2) and oils the bearing-surface between the hub A' and the sleeve $A^2$. The cup is held in position by any suitable means, as by the band or loop $E^7$.

It is of course evident that the friction-disk A instead of being opposed to the car-wheel B may be opposed to a disk or moving part B' on the axle, as illustrated in Fig. 3. In this figure I have shown the parts as shaped somewhat differently from the parts illustrated in Fig. 2. The partition $A^7$, for example, which separates the oil-space $A^5$ from the friction-space $A^6$, extends closer to the axle, and the hub of the friction-disk is provided with two oil-cavities and is longer than the hub shown in Fig. 2. Any suitable means may be used for bringing the friction-disk against its opposed surface, and I do not limit myself in any manner in this particular.

I have described in detail a construction embodying my invention; but it is of course evident that this construction may be greatly varied and that other applications of my invention may be made than those herein illustrated, and I therefore do not wish to be limited to the construction shown.

I have used the terms "friction-space" and "oil-space;" but I do not limit myself to any particular shape of friction-space or oil-space, and by "friction-space" I mean the space between any two opposed frictional surfaces.

I claim—

1. A brake mechanism, comprising a friction-disk mounted upon a movable part, an opposed part connected with a moving part of the car, a friction-space between said friction-disk and said opposed part, an oil-space at one side of said friction-space for receiving waste or overflow oil or the like, a partition separating said friction and oil spaces from each other.

2. A brake mechanism, comprising a friction-disk mounted upon a moving part, an opposed part connected with said moving part so as to move therewith, a friction-space between said friction-disk and said opposed part, an oil-space in said disk separated from said friction-space and adapted to receive the oil from the bearing of said friction-disk and a series of outlets leading from said oil-space.

3. A brake mechanism, comprising a friction-disk mounted upon the axle of the vehicle, an opposed part connected with said axle so as to rotate therewith, a friction-space between said opposed part and said friction-disk, an oil-space in said friction-disk separated from said friction-space and an opening leading from said oil-space to the outer face of the friction-disk.

4. A brake mechanism, comprising a friction-disk mounted upon the axle of the vehicle, an opposed part connected with said axle so as to rotate therewith, a friction-space between said friction-disk and said opposed part, a friction material contained within said space, an oil-space in said disk, a partition separating said friction-space from said oil-space and an outlet for said oil-space adapted to convey the oil away so that it will not enter the friction-space.

5. A brake mechanism for vehicles, comprising a friction-disk mounted upon the vehicle-axle, an opposed part connected with said axle so as to rotate therewith, a friction-space between said disk and opposed part, a friction material contained within said friction-space, an oil-space contained within said friction-disk and adapted to receive the waste oil from the bearing of the same, a partition separating said friction-space from said oil-space and a series of openings extending from said oil-space to the outer surface of said friction-disk so as to convey the oil therefrom and prevent it from entering the friction-space.

6. A brake mechanism, comprising a friction-disk mounted upon the axle, means for oiling the bearing of said friction-disk, a part opposed to said disk and connected with said axle so as to rotate therewith, means for moving said part and disk with relation to each other so as to produce frictional contact and an oil-space contained within said disk and adapted to receive the waste oil from the bearing and conduct it away from the opposed surfaces of said disk and opposed part.

WILLIAM G. PRICE.

Witnesses:
 DONALD M. CARTER,
 HOMER L. KRAFT.